United States Patent
Megaridis et al.

(10) Patent No.: US 9,217,094 B2
(45) Date of Patent: *Dec. 22, 2015

(54) SUPERHYDROPHOBIC COMPOSITIONS

(75) Inventors: Constantine M. Megaridis, Oak Park, IL (US); Thomas M. Schutzius, Tinley Park, IL (US); Ilker S. Bayer, Arnesano (IT); Jian Qin, Appleton, WI (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 168 days.

This patent is subject to a terminal disclaimer.

(21) Appl. No.: 13/193,145

(22) Filed: Jul. 28, 2011

(65) Prior Publication Data
US 2013/0030098 A1 Jan. 31, 2013

(51) Int. Cl.
| | | |
|---|---|---|
| *C08K 9/04* | (2006.01) | |
| *C09D 127/16* | (2006.01) | |
| *C08K 5/02* | (2006.01) | |
| *B05D 5/08* | (2006.01) | |
| *C08K 13/02* | (2006.01) | |
| *C08K 3/34* | (2006.01) | |

(52) U.S. Cl.
CPC ............... *C09D 127/16* (2013.01); *B05D 5/083* (2013.01); *C08K 5/02* (2013.01); *C08K 13/02* (2013.01); *C08K 3/346* (2013.01); *C08K 2201/011* (2013.01)

(58) Field of Classification Search
CPC ............ C08K 9/06; C08K 3/346; C08K 5/01; C08K 5/02; C09D 1/00; B05D 5/08; B05D 5/083; B82Y 30/00; C11D 7/14; C11D 7/22; C11D 7/24; C11D 7/28; D06M 2200/12

USPC .......................... 524/425, 430, 432, 422, 445; 106/287.17, 243, 241, 157.8
See application file for complete search history.

(56) References Cited

U.S. PATENT DOCUMENTS

| | | | |
|---|---|---|---|
| 3,338,992 A | 8/1967 | Kinney | |
| 3,341,394 A | 9/1967 | Kinney | |
| 3,494,821 A | 2/1970 | Evans | |
| 3,502,763 A | 3/1970 | Hartmann | |
| 3,542,615 A | 11/1970 | Dobo et al. | |
| 3,574,791 A * | 4/1971 | Sherman et al. | ............... 525/276 |
| 3,692,618 A | 9/1972 | Dorschner et al. | |
| 3,802,817 A | 4/1974 | Matsuki et al. | |
| 3,849,241 A | 11/1974 | Butin et al. | |

(Continued)

FOREIGN PATENT DOCUMENTS

| | | |
|---|---|---|
| CN | 101434802 A | 5/2009 |
| CN | 101845242 A | 9/2010 |

(Continued)

OTHER PUBLICATIONS

Co-pending U.S. Appl. No. 13/193,065, filed Jul. 28, 2011, by Qin et al. for "Superhydrophobic Surfaces."

(Continued)

*Primary Examiner* — Jane L Stanley
(74) *Attorney, Agent, or Firm* — Dority & Manning, P.A.

(57) ABSTRACT

The present invention relates to a stable dispersion comprising at least, but not limited to, three key elements that, when combined accordingly, can achieve the desired superhydrophobic results; the at least three elements being a hydrophobic component, nano-structured particles and water.

11 Claims, 7 Drawing Sheets

(56) References Cited

U.S. PATENT DOCUMENTS

| | | | |
|---|---|---|---|
| 3,855,046 A | 12/1974 | Hansen et al. | |
| 4,100,324 A | 7/1978 | Anderson et al. | |
| 4,144,370 A | 3/1979 | Boulton | |
| 4,340,563 A | 7/1982 | Appel et al. | |
| 4,659,609 A | 4/1987 | Lamers et al. | |
| 4,833,003 A | 5/1989 | Win et al. | |
| 5,048,589 A | 9/1991 | Cook et al. | |
| 5,108,820 A | 4/1992 | Kaneko et al. | |
| 5,108,827 A | 4/1992 | Gessner | |
| 5,284,703 A | 2/1994 | Everhart et al. | |
| 5,294,482 A | 3/1994 | Gessner | |
| 5,336,552 A | 8/1994 | Strack et al. | |
| 5,350,624 A | 9/1994 | Georger et al. | |
| 5,382,400 A | 1/1995 | Pike et al. | |
| 5,399,412 A | 3/1995 | Sudall et al. | |
| 5,468,598 A * | 11/1995 | Miller et al. | 430/372 |
| 5,510,001 A | 4/1996 | Hermans et al. | |
| 5,539,021 A | 7/1996 | Pate et al. | |
| 5,591,309 A | 1/1997 | Rugowski et al. | |
| 5,620,779 A | 4/1997 | Levy et al. | |
| D390,708 S | 2/1998 | Brown | |
| 5,759,926 A | 6/1998 | Pike et al. | |
| 5,935,883 A | 8/1999 | Pike | |
| 5,962,112 A | 10/1999 | Haynes et al. | |
| 6,017,417 A | 1/2000 | Wendt et al. | |
| D428,267 S | 7/2000 | Romano, III et al. | |
| 6,093,665 A | 7/2000 | Sayovitz et al. | |
| 6,103,061 A | 8/2000 | Anderson et al. | |
| 6,197,404 B1 | 3/2001 | Varona | |
| 6,200,669 B1 | 3/2001 | Marmon et al. | |
| 6,315,864 B2 | 11/2001 | Anderson et al. | |
| 6,432,270 B1 | 8/2002 | Liu et al. | |
| 7,087,662 B2 * | 8/2006 | Ghosh et al. | 523/223 |
| 7,732,497 B2 | 6/2010 | Cumberland et al. | |
| 2002/0045010 A1 * | 4/2002 | Rohrbaugh et al. | 427/372.2 |
| 2004/0077770 A1 | 4/2004 | Zaghib et al. | |
| 2005/0100754 A1 | 5/2005 | Moncla et al. | |
| 2005/0205830 A1 | 9/2005 | Oles et al. | |
| 2005/0229327 A1 | 10/2005 | Casella et al. | |
| 2006/0172641 A1 | 8/2006 | Hennige et al. | |
| 2007/0027232 A1 | 2/2007 | Walsh et al. | |
| 2007/0128142 A1 | 6/2007 | Harrison et al. | |
| 2007/0135007 A1 | 6/2007 | McCarthy et al. | |
| 2007/0264437 A1 | 11/2007 | Zimmermann et al. | |
| 2008/0015298 A1 | 1/2008 | Xiong et al. | |
| 2008/0102347 A1 | 5/2008 | Blunk | |
| 2008/0153963 A1 * | 6/2008 | Baran et al. | 524/414 |
| 2008/0221009 A1 | 9/2008 | Kanagasabapathy et al. | |
| 2008/0221263 A1 | 9/2008 | Kanagasabapathy et al. | |
| 2008/0245273 A1 | 10/2008 | Vyorkka et al. | |
| 2008/0250978 A1 * | 10/2008 | Baumgart et al. | 106/287.19 |
| 2008/0268233 A1 | 10/2008 | Lawin et al. | |
| 2009/0107524 A1 * | 4/2009 | Gross et al. | 134/7 |
| 2009/0227164 A1 | 9/2009 | Broch-Nielsen et al. | |
| 2009/0298369 A1 | 12/2009 | Koene et al. | |
| 2010/0068434 A1 | 3/2010 | Steele et al. | |
| 2010/0069864 A1 | 3/2010 | Berland et al. | |
| 2010/0092809 A1 | 4/2010 | Drzal et al. | |
| 2010/0184346 A1 | 7/2010 | Qi et al. | |
| 2010/0189925 A1 | 7/2010 | Li et al. | |
| 2010/0266648 A1 | 10/2010 | Ranade et al. | |
| 2011/0021698 A1 | 1/2011 | Vyörykkä et al. | |
| 2011/0207850 A1 | 8/2011 | Kan et al. | |
| 2011/0287203 A1 | 11/2011 | Victor et al. | |
| 2011/0311757 A1 * | 12/2011 | Iverson et al. | 428/85 |

FOREIGN PATENT DOCUMENTS

| | | |
|---|---|---|
| KR | 10-0823895 B1 | 4/2008 |
| KR | 10-2011-0059173 A | 6/2011 |
| WO | WO 99/09070 A1 | 2/1999 |
| WO | WO 2009/118552 A1 | 10/2009 |
| WO | WO 2010/002859 A2 | 1/2010 |
| WO | WO 2010/073623 A1 | 7/2010 |
| WO | WO 2011/020701 A1 | 2/2011 |

OTHER PUBLICATIONS

Bhushan, Bharat and Eun Kyu Her, "Fabrication of Superhydrophobic Surfaces with High and Low Adhesion Inspired from Rose Petal," Langmuir, vol. 26, No. 11, 2010, pp. 8207-8217.

American Society for Testing Materials (ASTM) Designation: F903-10, "Standard Test Method for Resistance of Materials Used in Protective Clothing to Penetration by Liquids," pp. 1-10, published Feb. 2010.

Machine Translation of Chinese Patent—CN1830909. Sep. 13, 2006, 10 pages.

* cited by examiner

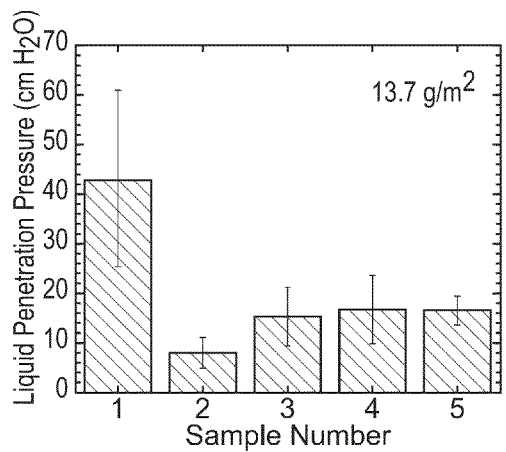
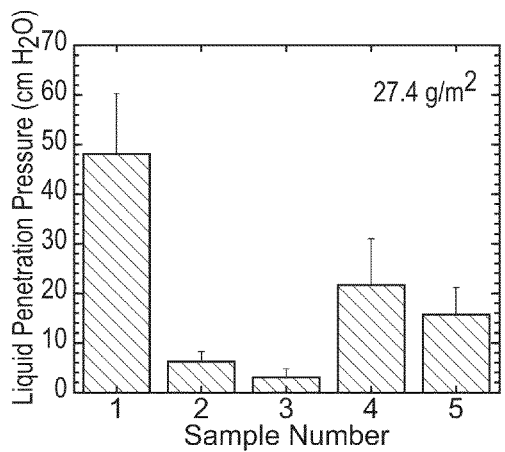
FIG. 5A          FIG. 5B
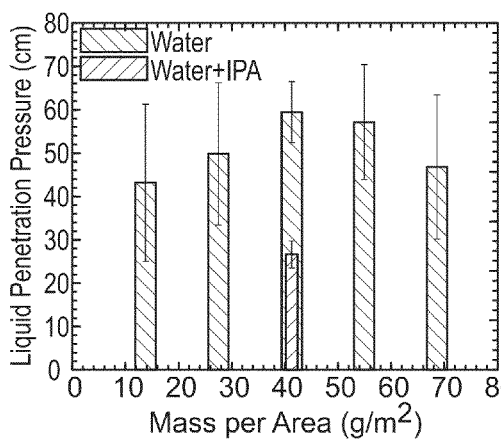
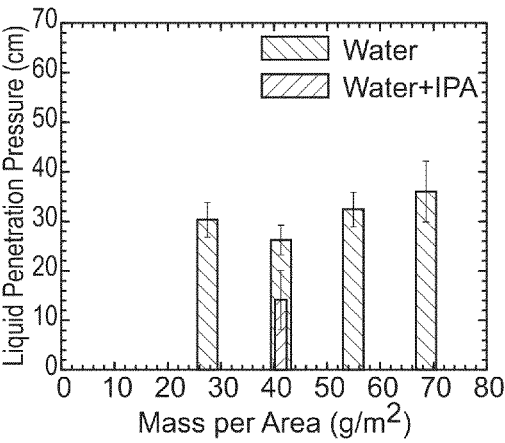
FIG. 6A          FIG. 6B

SUPERHYDROPHOBIC COMPOSITIONS

FIELD OF THE INVENTION

The present invention relates to coating compositions that exhibit superhydrophobic properties comprising a water-based, non-organic solvent.

BACKGROUND OF THE INVENTION

A superhydrophobic surface exhibits a sessile water contact angle of greater than 150°. If, additionally, the surface exhibits a water droplet roll-off (sliding) angle of less than 10% the surface is deemed to be "self-cleaning". In nature, lotus leaves exhibit such properties (so-called lotus effect). Most of man-made materials, such as fabrics, nonwovens, cellulose tissues, polymer films, etc., do not have surfaces with such properties. Currently, there are generally two methods to modify a non-superhydrophobic surface to achieve the lotus effect. One method is to graft a hydrophobic monomer onto every surface of a non-superhydrophobic material. Such a method makes the material superhydrophobic throughout the thickness of the material, which may not be desired in most cases. It is also not cost effective, cannot be used for a continuous production, and may lead to undesirable environment issues. Another approach is to coat a specially formulated liquid dispersion onto a surface, and upon subsequent drying, a nano-structured superhydrophobic film forms. In order to utilize such an approach, the deposited film must exhibit a chemical and physical morphology characteristic of superhydrophobic surfaces. First, the formulation requires at least one low-surface energy (i.e., hydrophobic) component, such as a perfluorinated polymer (e.g., polytetrafluoroethylene), and second, the treated surface has to have a rough surface texture, preferably at several length-scales—micro and nano-roughness. Although various formulated dispersions capable of achieving a superhydrophobic surface exist, none of these dispersions appear to be purely water-based. For a multitude of safety, health, economic, and environmental issues, it is also important that the dispersion be fully aqueous-based when regarding commercial scale production, as this will decrease concerns associated with the use of organic solvents.

SUMMARY OF THE INVENTION

The present invention relates to a superhydrophobic dispersion composition comprising: (a) a hydrophobic component, (b) nano-structured particles, and (c) water.

BRIEF DESCRIPTION OF THE FIGURES

FIG. 3(*b*) shows the void fraction of a hydrophobic, melt-blown substrate as a function of substrate depth for the pristine substrate (uncoated, open squares) and for the same substrate with a hydrophobic coating (open circles).

FIG. 3(*c*) shows the void fraction of a spunbond substrate as a function of substrate depth for the pristine substrate (uncoated, open squares) and for the same substrate with a hydrophobic coating (open circles).

FIG. 3(*d*) shows the void fraction of a Kimberly-Clark® Towel as a function of substrate depth for the pristine substrate (uncoated, open squares) and for the same substrate with a hydrophobic coating (open circles).

FIG. 4(*b*) shows water droplet pearls at rest on a coated KC Hydroknit® substrate.

FIG. 5(*a*) shows the hydrohead for five varying samples after being coated with a formulation at a coating level of 13.7 g/m$^2$.

FIG. 5(*b*) shows the hydrohead for five varying samples after being coated with a formulation at a coating level of 27.4 g/m$^2$.

FIGS. 6(*a*) & 6(*b*) shows the hydrohead for two varying samples. Tests were performed with two probe liquids.

DETAILED DESCRIPTION OF THE INVENTION

Figure 1:
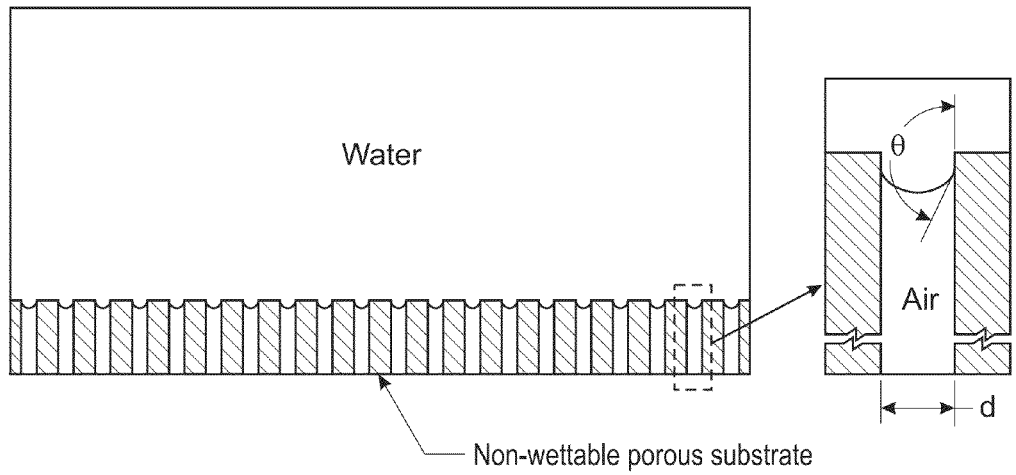
FIG. 1 shows a non-wettable porous substrate resisting penetration of water due to its small pore size d and high hydrophobicity (high contact angle, θ).

All percentages are by weight of the total composition unless specifically stated otherwise. All ratios are weight ratios unless specifically stated otherwise.

The term "superhydrophobic" refers to the property of a surface to repel water very effectively. This property is quantified by a water contact angle exceeding 150°.

The term "hydrophobic", as used herein, refers to the property of a surface to repel water with a water contact angle from about 90° to about 120°.

The term "hydrophilic", as used herein, refers to surfaces with water contact angles well below 90°.

The term "self-cleaning," as used herein, refers to the property to repel water with the water roll-off angle on a tilting surface being below 10°.

The present invention relates to a stable dispersion comprising at least, but not limited to, three key elements that, when combined accordingly, can achieve the desired superhydrophobic results; the at least three elements being a hydrophobic component, nano-structured particles and water. Other ingredients such as surfactants, binders, fillers, biocides, coloring agent, propellants, stabilizers, crosslinking agents, functionalized modifiers, and the like also help to compliment the superhydrophobic properties of the present invention.

A more detailed description of some of the ingredients utilized in the preferred embodiments of the present invention is as follows:

Hydrophobic Component

The hydrophobic component is a hydrophobic polymer that is dispersible in water to form the basic elements of the superhydrophobic properties of the present invention. In general, a hydrophobic component of this invention may include, but is not limited to, fluorinated or perfluorinated polymers. However, due to low degree of water dispersibility, the fluorinated or perfluorinated polymer may need to be modified by introducing a comonomer onto their molecular structure. Suitable comonomers include, but are not limited to, ethylenically unsaturated monomers comprising functional groups which are capable of being ionized in water. One example is ethylenically unsaturated carboxylic acid, such as acrylic acid. The amount of the comonomer within the hydrophobic component is determined by balancing two properties: hydrophobicity and water dispersibility. One example of the hydrophobic component of this invention is a commercially available modified perfluorinated polymer compound available from DuPont as a water-based product under the trade name Capstone® ST-100. Due to its low surface energy, the polymer not only contributes to the superhydrophobicity, but it may also act as a binder to adhere the nano-structured particles of the present invention onto the surface. Additionally, the polymer molecules can be modified to contain groups, such as amines, that can become charged upon pH reduction and alter the dynamics of hydrophobicity within the liquid dispersion. In such a case, the polymer may stabilize in water through partial interaction. Surfactants that are introduced into the composition may also behave as dispersants of the polymer, thereby also altering some of the hydrophobic mechanics.

The solid components of the present invention (i.e., polymer, nano-structured particles) may be present in an amount from about 1.0% to about 3.0%, by weight of the solution. Such an amount is suitable for spray applications where higher concentrations of either polymer and/or nano-structured particles in the dispersion can lead to either viscoelastic behavior, resulting in either clogging of the spray nozzle or incomplete atomization and fiber formation, or dramatic increases in dispersion viscosity and thus nozzle clogging. It should be noted that this range is not fixed and that it is a function of the materials being utilized and the procedure used to prepare the dispersion. When a higher amount of the polymer is used, the surface structure is less desirable as it lacks the proper texture to be superhydrophobic. When a lower amount of the polymer is used, the binding is less desirable as the coating behaves more so as a removable powder coating. Additionally, it is desired that the polymer-to-particle weight ratio be about 4:1 or about 3:2, or about 1:1, or about 2:3, or about 1:4 in order to optimize the balance between low surface energy and desirable surface texture.

Non-Organic Solvent

The formulation used in treating the surface of the present invention eliminates the use of an organic solvent by carefully selecting the appropriate combination of elements to impart the superhydrophobic characteristics. Preferably, the non-organic solvent is water. Any type of water may be used; however, demineralized or distilled water may be opted for use during the manufacturing process for enhanced capabilities. The use of water helps to reduce the safety concerns associated with making commercial scale formulations comprising organic solvents. For example, due to the high volatility and flammability of most organic solvents, eliminating such use in the composition reduces production safety hazards. Additionally, production costs may be lowered with the elimination of ventilation and fire prevention equipment necessitated by organic solvents. Raw material costs may be reduced in addition to the transportation of such materials as an added advantage to utilizing the non-organic solvent formulation to arrive at the present invention.

Additionally, since water is considered a natural resource, surfaces treated with solvents comprising water as its base may be considered healthier and better for the environment. The formulation used to treat the surface of the present invention comprises greater than about 95%, greater than about 98%, or about 99% water, by weight of the dispersion composition.

Nano-Structured Particles

Nano-structured particles, which we define here as particles exhibiting repeating feature sizes <100 nm, are used in the present invention to achieve a desirable rough surface. The particles may be from the class of fumed silicas, hydrophobic titanium and zinc oxides, and unmodified as well as organically modified nanoclays. Although hydrophobic particles may be used, it is desirable that the particles of the present invention be hydrophilic. If hydrophobic particles are used, the particles must be treated by a surfactant prior to being dispersed in water in order to prevent agglomeration. When used, the amount of surfactant present must be kept at a low concentration in order that the desired superhydrophobic properties are maintained. Therefore, the use of surfactants within the present invention should be from about 0%, or from about 0.25%, or from about 1.0% to no more than about 0.5%, or no more than about 1.5% or no more than about 2%, by weight of the total composition. Such surfactants can be nonionic, cationic, or anionic in nature. Suitable anionic surfactants may include, but are not limited to sulfonates, carboxylates, and phosphates. Suitable cationic surfactants may include, but are not limited to, quaternary amines. Suitable nonionic surfactants may include, but are not limited to, block copolymers containing ethylene oxide and silicone surfactants.

Other Ingredients

Binders

The hydrophobic polymers of the present invention play a dual role in acting both as a hydrophobic component and a binder. Polymers such as Dupont's Capstone® ST-100 promote adhesion, as compared to the fluorinated polymer alone, so that an additional binder within the composition is not necessary. If a water-dispersible hydrophobic polymer is used wherein an additional binder is needed, it is preferred that the binder is selected from water-dispersible acrylics, polyurethane dispersions, acrylic copolymers, or acrylic polymer precursors (which can cross link after the coating is cured).

The amount of the binder present within the formulation of the present invention may vary. A binder may be included in an effective amount of up to about 2.0% by weight of the total dispersion composition.

Stabilizing Agent

The formulation of the present invention may be additionally treated with a stabilizing agent to promote the formation of a stable dispersion when other ingredients are added to it. The stabilizing agent may be a surfactant, a polymer, or mixtures thereof. If a polymer acts as a stabilizing agent, it is preferred that the polymer differ from the hydrophobic component used within the base composition previously described.

Additional stabilizing agents may include, but are not limited to, cationic surfactants such as quaternary amines; anionic surfactants such as sulfonates, carboxylates, and phosphates; or nonionic surfactants such as block copolymers containing ethylene oxide and silicone surfactants. The surfactants may be either external or internal. External surfactants do not become chemically reacted into the base polymer during dispersion preparation. Examples of external surfactants useful herein include, but are not limited to, salts of dodecyl benzene sulfonic acid and lauryl sulfonic acid salt.

Internal surfactants are surfactants that do become chemically reacted into the base polymer during dispersion preparation. An example of an internal surfactant useful herein includes 2,2-dimethylol propionic acid and its salts.

In some embodiments, the stabilizing agent used within the composition to treat the surface of the present invention may be used in an amount ranging from greater than zero to about 60% by weight based on the amount of hydrophobic component used. For example, long chain fatty acids or salts thereof may be used from about 0.5% to about 10% by weight based on the amount of hydrophobic component. In other embodiments, ethylene-acrylic acid or ethylene-methacrylic acid copolymers may be used in an amount up to about 80% by weight based on the weight of hydrophobic component. In yet other embodiments, sulfonic acid salts may be used in an amount from about 0.01% to about 60% by weight based on the weight of the hydrophobic component. Other mild acids, such as those in the carboxylic acid family (e.g., formic acid), may also be included in order to further stabilize the dispersion. In an embodiment that includes formic acid, the formic acid may be present in amount that is determined by the desired pH of the dispersion wherein the pH is less than about 6.

Additional Fillers

The composition used to treat the surface of the present invention may further comprise one or more fillers. The composition may comprise from about 0.01 to about 600 parts by weight of the hydrophobic component, for example, polyolefin and the stabilizing agent. In certain embodiments, the filler loading in the composition can be from about 0.01 to about 200 parts by the weight of the hydrophobic component, for example, polyolefin, and the stabilizing agent. It is preferred that such filler material, if used, be hydrophilic. The filler material can include conventional fillers such as milled glass, calcium carbonate, aluminum trihydrate, talc, antimony trioxide, fly ash, clays (such as bentonite or kaolin clays for example), or other known fillers. Untreated clays and talc are usually hydrophilic by nature.

Treated Surfaces

The formulation of the present invention may be used to treat a surface in order that the surface exhibits superhydrophobic properties. Surfaces treated may include a variety of materials including, but not limited to metal; wood; plastic; electronic substrates; athletic surfaces such as turf, track, courts, and the like; brick; concrete; tile; stone; granite; mortar; marble; limestone; slate; clay; and the like. An example of a potential substrate to be coated may include a hydrophilic cellulosic substrate when seeking to reduce its sorptivity on its one face, while preserving it on the other, and to increase its wet strength. Another example is a hydrophobic substrate when seeking to improve its existing water-repellency.

Suitable substrates of the present invention can include a nonwoven fabric, woven fabric, knit fabric, or laminates of these materials. Materials and processes suitable for forming such substrates are generally well known to those skilled in the art. For instance, some examples of non-woven fabrics that may be used in the present invention include, but are not limited to, spunbonded webs, meltblown webs, bonded carded webs, air-laid webs, coform webs, spunlace nonwoven web, hydraulically entangled webs, and the like. In each case, at least one of the fibers used to prepare the nonwoven fabric is a thermoplastic material containing fiber. In addition, nonwoven fabrics may be a combination of thermoplastic fibers and natural fibers, such as, for example, cellulosic fibers (softwood pulp, hardwood pulp, thermomechanical pulp, etc.). Generally, from the standpoint of cost and desired properties, the substrate of the present invention is a nonwoven fabric.

Suitable substrates of the present invention can also include a cellulosic wood pulp-based basesheet, such as facial tissues, bath tissues, paper towels, and napkins.

Manufacture

Conventional scalable methods, such as spraying, can be used to apply a superhydrophobic coating on a surface. In one embodiment, a hydrophilic nano-structured filler (Nanomer® PGV nanoclay from Sigma Aldrich), which is a bentonite clay without organic modification is used. As a hydrophobic component, a 20 wt. % dispersion of a fluorinated acrylic co-polymer (PMC) in water is used, as obtained from DuPont (trade name is Capstone® ST-100). The hydrophilic nanoclay is added to water and is sonicated until a stable suspension is produced. Sonication can be done by utilizing a probe sonicator at room temperature (Sonics®, 750 W, High Intensity Ultrasonic Processor, 13 mm diameter tip at 30% amplitude). At these settings, it may take from about 15 to about 30 min for a stable 15.5 g nanoclay-water suspension to form. The concentration of the nanoclay in water is kept below 2 wt. % of total suspension to prevent the formation of a gel, which renders the dispersion too viscous to spray. After placing the stable clay-water suspension under mechanical mixing at room temperature, the aqueous PMC dispersion is added drop-wise to the suspension to produce the final dispersion for spray. In such embodiment, the concentrations of each component in the final dispersion for producing a superhydrophobic coating will be as follows: 95.5 wt. % water, 2.8% PMC, 1.7% nanoclay or 97.5 wt. % water, 1.25% PMC, 1.25% nanoclay. Coatings may be applied by spray onto cellulosic substrates at a distance of about 15 to about 25 cm using an airbrush atomizer (Paasche VL siphon feed, 0.55 mm spray nozzle) either by hand or by mounting the device onto an industrial fluid dispensing robot (EFD, Ultra TT Series). EFD nozzles with air assist may also be utilized as this achieves extremely fine mists during spray application. The smallest nozzle diameter suggested for the EFD dispensing system is about 0.35 mm. The air fans assist in shaping the spray cone into an oval shape, which is useful for producing a continuous uniform coating on a linearly moving substrate. For the airbrush, operation relies on pressurized air passing through the nozzle in order to siphon-feed the particle dispersion and also to facilitate fluid atomization at the nozzle exit. The pressure drop applied across the sprayer may vary from about 2.1 to about 3.4 bar, depending on conditions.

Some technical difficulties are typically encountered when spraying water-based dispersions: The first major problem is insufficient evaporation of the fluid during atomization and a high degree of wetting of the dispersion onto the coated substrate, both resulting in non-uniform coatings due to contact line pinning and the so called "coffee-stain effect" when the water eventually evaporates. The second major challenge is the relatively large surface tension of water when compared with other solvents used for spray coating. Water, due to its high surface tension, tends to form non-uniform films in spray applications, thus requiring great care to ensure that a uniform coating is attained. This is especially critical for hydrophobic substrates where the water tends to bead and roll. It was observed that the best approach for applying the aqueous dispersions of the present invention was to produce extremely fine droplets during atomization, and to apply only very thin coatings, so as not to saturate the substrate and re-orient hydrogen bonding within the substrate which, after drying, would cause cellulosic substrates (e.g. paper towel) to become stiff.

In another embodiment, the coatings are spray cast first on a substrate, such as standard paperboard or other cellulosic substrate; multiple spray passes are used to achieve different coating thicknesses. The sprayed films are then subjected to drying in an oven at about 80° C. for about 30 min to remove all excess water. The size of the substrate may be approximately, but not limited to about 7.5 cm×9 cm. Once dried, the coatings are characterized for wettability (i.e., hydrophobic vs. hydrophilic). The substrates may be weighed on a microbalance (Sartorius® LE26P) before and after coating and drying in order to determine the minimum level of coating required to induce superhydrophobicity. This "minimum coating" does not strictly mean that the sample will resist penetration by liquids, but rather that a water droplet will bead on the surface and roll off unimpeded. Liquid repellency of substrates before and after coating may be characterized by a hydrostatic pressure setup that determines liquid penetration pressures (in cm of liquid).

Performance Characterization

Contact angle values may be obtained by a backlit optical image setup utilizing a CCD camera. For dynamic contact angle hysteresis measurements (which designate the self-cleaning property), the CCD camera may be replaced by a high-speed camera, such as Redlake™ Motion Pro, in order to accurately capture advancing and receding contact angle values. The lower the difference between advancing and receding contact angles (i.e. contact angle hysteresis), the more self-cleaning the surface is. Liquid penetration pressure may be determined by increasing the hydrostatic column pressure until liquid penetrates the sample in accordance with ASTM F903-10. Liquid penetration may be recorded by an optical image setup utilizing a CCD camera.

Wettability of the composite coatings may be first tested on paperboard, an untextured hydrophilic cellulosic substrate deemed to be representative of the general class of cellulosic substrates (textured or untextured). Nanoclay concentration is incorporated at increasing concentrations in the coating until self-cleaning behavior is observed. The purpose of adding nanoclay to the composite coating is to affect the texture of the coating. It is known that superhydrophobicity and self-cleaning behavior are controlled by two mechanisms, namely, surface roughness and surface energy. It has also been shown that hierarchical structures in conjunction with low-surface energy groups offer an excellent pathway for achieving the roughness necessary for superhydrophobicity. Nanoclay has a platelet structure with nanoscale thickness and microscale length which, when self-assembled (through electrostatic interaction), produces the aforementioned hierarchical structure. The level of nanoclay concentration in the composite coating where self-cleaning is first observed is about 38 wt. % of final composite coating (about 62 wt. % PMC of final coating). When this composite coating is spray cast on paperboard, it can achieve a contact angle of about 146±3° (nearly superhydrophobic), and a contact angle hysteresis of about 21±5°. A lower value of hysteresis may be expected for more hydrophobic nano-structured particles, but aqueous dispersions based on hydrophobic fillers are extremely difficult to realize.

Figure 2:
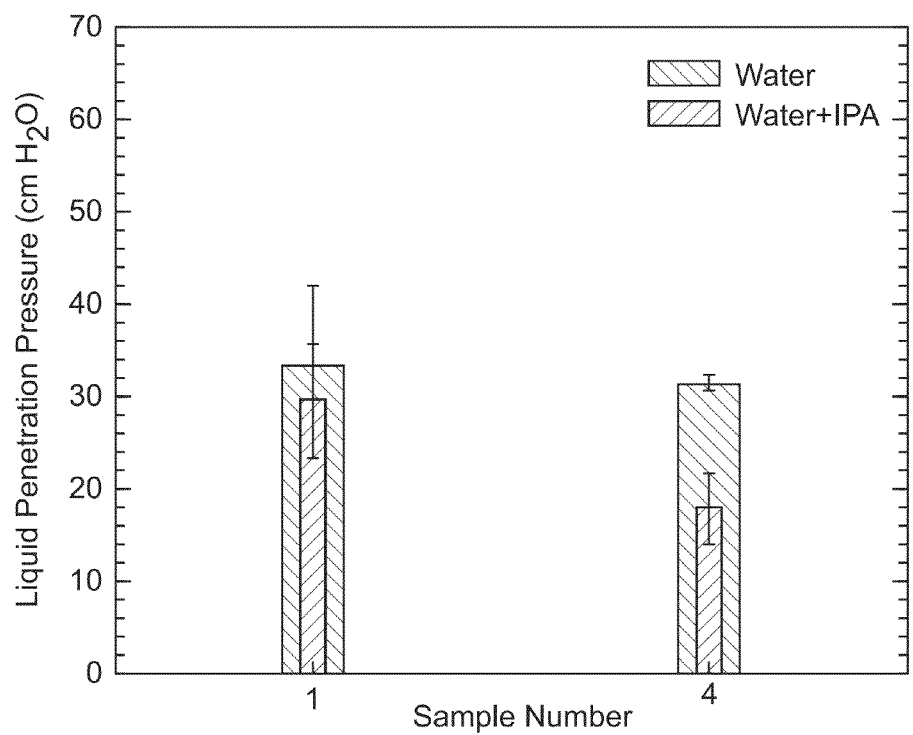
FIG. 2 shows water and water+isopropyl alcohol (IPA) mixture penetration pressures (hydrohead) for a hydrophobic, melt-blown substrate (Sample 1) and a hydrophilic, cellulosic-based substrate (Sample 4), both coated with an aqueous fluorochemical dispersion, PMC (trade name Capstone ST-100, fluorinated acrylic copolymer, 20 wt. % in water, obtained from DuPont). There are no nano-structured particles in this formulation, wherein the coating mass per unit area is >10 g/m$^2$.

While in the case of superhydrophobicity the emphasis is placed on increasing roughness and lowering surface energy, for resisting penetration of liquids into substrates, substrate pore size and surface energy are important factors. FIG. 1 shows an ideally configured porous substrate (straight pores of uniform diameter d distributed evenly) resisting penetration of water. In this configuration, the pressure necessary for penetration of a hydrophobic substrate with pore size d is given by the Young-Laplace equation $\Delta p = 4\gamma \cos\theta/d$, where $\gamma$ is the surface tension of water, and $\theta(\theta>90°)$ is the contact angle between water and the substrate. The more hydrophobic the porous substrate (i.e., the higher the value of $\theta$), the higher the liquid penetration pressure $\Delta p$. It is apparent that penetration pressure scales inversely with the pore size (the finer the pore, the higher the pressure required to cause water penetration). While pore size may be affected by applying relatively thick coating treatments (other hydrophobic formulations) to porous substrates, the effective pore size after coating is generally predetermined by the pore size of the substrate prior to the coating treatment. The general purpose of applying the coating treatment is to decrease the surface energy of the substrate. In the case of a hydrophilic, cellulosic-based substrate, the coating treatment may not produce a uniform, low-surface energy film around some fibers, which, being hydrophilic, may absorb water readily to result in a 0 cm liquid penetration pressure value. Adding coating treatments should confer some appreciable resistance to water penetration. The effectiveness of this approach is measured by the liquid penetration pressure (i.e. "hydrohead", which is measured in cm of the liquid used to challenge a surface). The higher this pressure is, the more effective the coating method is in imparting hydrophobicity to the substrate. Naturally, the liquid penetration pressure depends on the liquid used (value of $\gamma$ in the Young-Laplace equation). Since alcohols have lower surface tension than water, mixtures of water and alcohol result in lower penetration pressures. To show this, FIG. 2 presents liquid penetration pressures of water and water+IPA (9:1 wt.) mixture using only a coating by the fluorochemical dispersion (PMC) and no nano-structured particles. Clearly, the penetration pressure for the water+IPA mixture for both samples is lower than for water alone (as expected due to the lower surface tension of the mixture).

Figure 3A:
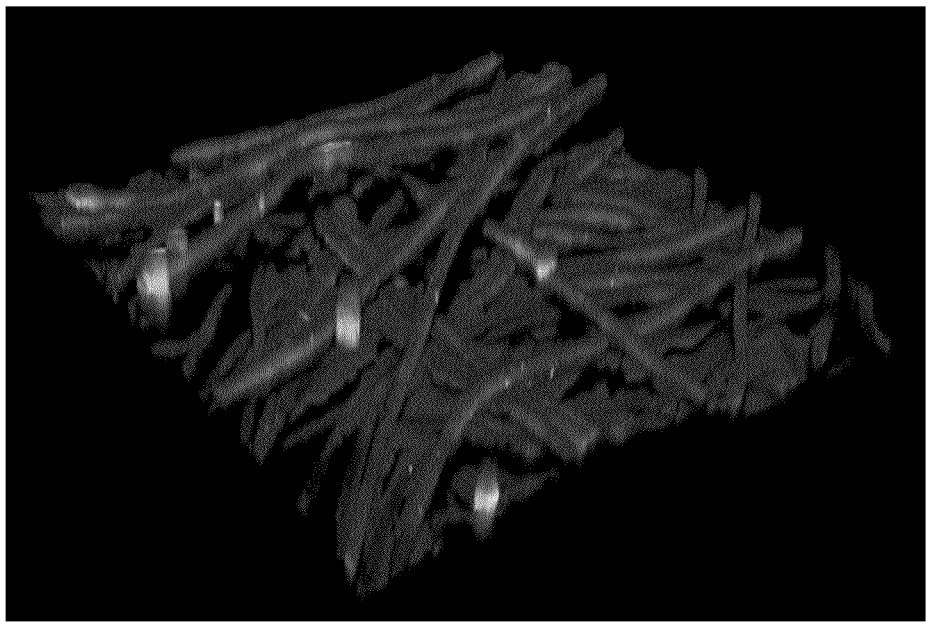
FIG. 3(*a*) shows a 3-dimensional confocal microscope image of a hydrophobic, melt-blown substrate that has been stained with a dye for fluorescence visualization.

Confocal microscopy observations can be performed to determine the porosity of a porous substrate. FIG. 3a shows a 3-dimensional confocal image, while FIG. 3b displays void fraction data for a hydrophobic, melt-blown substrate as a function of substrate depth. The void fraction values can be obtained from the confocal images at different depths of the porous substrate. Confocal microscopy can also be performed on other substrates but it has been determined that highly dense substrates may be too thick and densely packed to accurately determine their void fraction. For a hydrophobic, melt-blown substrate, it can be seen from FIG. 3b that void fraction is at a minimum near the center of the substrate. In brief, FIG. 3 shows how it is possible to affect void fraction (and the resulting pore size) by applying a coating. Clearly, the coated substrate has lower void faction, i.e. smaller pores, which translate into higher required penetration pressures.

EXAMPLES

The following examples provide formulations of compositions in accordance with the present invention and provide examples of the range of ingredient percentages by weight providing an effective amount of the particular ingredients deemed necessary to obtain the desired results in a single application. The examples are provided for exemplary purposes to facilitate understanding of the invention and should not be construed to limit the invention to the examples.

The water-based formulation, which is the focus of this technology, was developed as a result of extensive research with organic-based formulations. The overarching goal was to establish first the feasibility of the coating approach and subsequently reduce and ultimately eliminate the organic content. The following presents examples of both the organic-based and the water-based coating formulations and compare their performance after application on a series of substrates.

Materials: Poly(vinylidene fluoride) (PVDF) pellets ($M_w$~530,000 Da) for solution in NMP, PVDF powder (typical size 231±66 nm), ethyl 2-cyanoacrylate (ECA) monomer, trifluoroacetic acid (TFA), reagent grade ethanol and N-methyl-2-pyrrolidone (NMP) were all obtained from Sigma Aldrich, USA. The particle filler used was a nanoclay, namely Nanomer® 1.31PS, which is a montmorillonite clay surface-modified with 15-35 wt. % octadecylamine and 0.5-5 wt. % aminopropyltriethoxysilane, obtained from Sigma Aldrich, USA. The aqueous fluorochemical dispersion, termed PMC, has the trade name Capstone ST-100 (fluorinated acrylic copolymer, 20 wt. % in water) and was obtained from DuPont.

Spray Application: Coatings were spray cast onto the substrates with a single spray application at a fixed distance of 19 cm using an airbrush atomizer (Paasche VL siphon feed, 0.55 mm spray nozzle) mounted on an automated industrial dispensing robot (EFD, Ultra TT Series). The coated substrates were dried for 30 minutes at 80° C. in an oven, thus producing coatings that were subjected to subsequent structural and wettability characterization.

Baseline Organic-Based Composite Coating Composition (Formulation I): The dried composite coatings on the samples contain only PVDF, PMC and nanoclay.

Water-Organic Based Composite Coating Composition (Formulation II): The dried composite coatings on the samples contain only PVDF and PMC.

Pure Water-Based Composite Coating Compositions (Formulations III, IV and V): The dried composite coatings on the samples contain only the fluorinated acrylic copolymer PMC (Form. III) and nanoclay (Form. IV and V).

Table 1 below lists the superhydrophobic formulations prepared using the materials described above.

TABLE 1

Superhydrophobic Composition of Five Formulations with Gradually Decreasing Organic Solvent Content

| Formulation | Polymer | Solvent | Nano Particles | Additives |
|---|---|---|---|---|
| I | 1.4% PVDF 1.4% PMC | 75.3-74.7% Ethanol 12.5% NMP 5.5% Water | 1.1-1.7% Nanoclay | 2.8% Carboxylic acid (TFA) |
| II | 5% PMC | 45% Ethanol 45% Water | 5% PVDF powder | Carboxylic acid (TFA) traces |
| III | 5% PMC | 95% Water | N/A | N/A |
| IV | 2.8% PMC | 95.5% Water | 1.7% Nanoclay | N/A |
| V | PMC[a] | 97.5% Water | Nanoclay[a] | N/A |

[a]The wt. ratio of Nanoclay: (PMC + Nanoclay) was 0.2, 0.4, 0.5, 0.6 and 0.8.

Figure 4A:
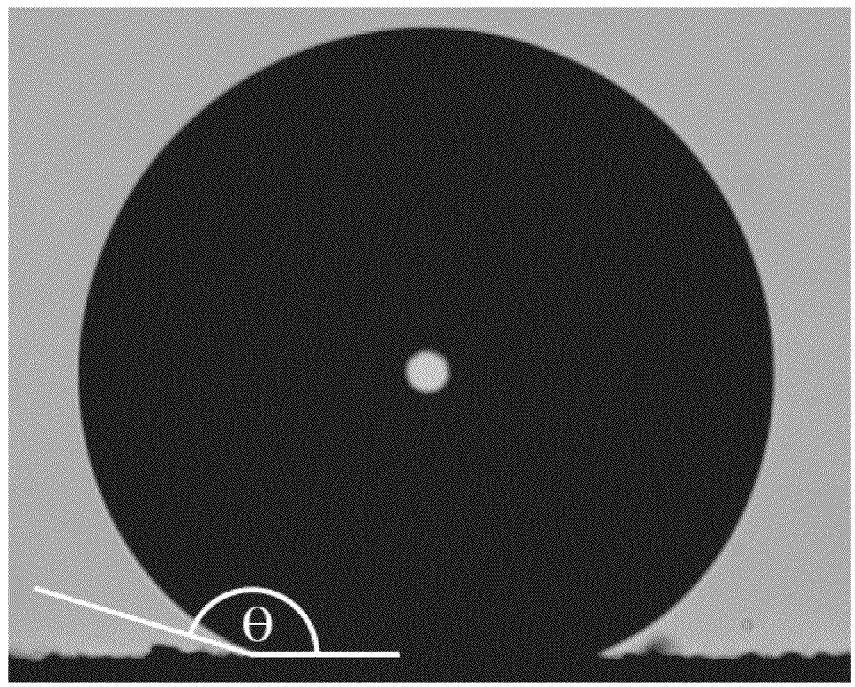
FIG. 4(*a*) shows sessile contact angle measurement technique. The coating texture is visible.
Figure 4B:
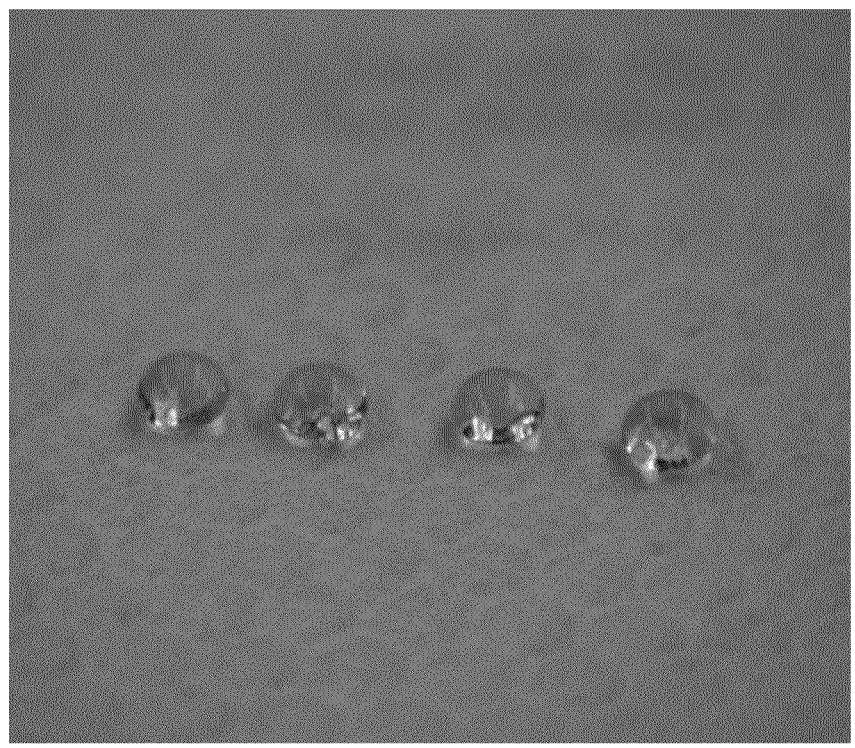

Formulations I-IV were sprayed onto paperboard substrates (standard paperboard that shipping boxes are made from) and water contact angles of the coated substrates were measured (see FIG. 4). Contact angle (CA) measurements were made on paperboard substrates, which do not have inherent texture, thus allowing accurate CA measurements.

Table 2 below lists contact angle testing results for the Formulations I-IV applied on paperboard substrates (required for accurate CA measurements). Both water and water-alcohol (10% isopropanol) were used in the contact angle test.

TABLE 2

Contact Angle Data for Coating Formulations I-IV with two Separate Probe Liquids

| Formulation | Water Contact Angle (deg) | Water-IPA Contact Angle (deg) |
|---|---|---|
| I | 165 ± 4 | 154 ± 4 |
| II | 158 ± 4 | 153 ± 4 |
| III | 126 ± 3 | 104 ± 3 |
| IV | 146 ± 3 | 135 ± 3 |

Table 3 below lists contact angle testing results for the five cases of Formulation V applied on standard wood-free photocopy paper (brand High White) substrates. This paper was purchased from a wholesaler. It is made in Brazil with a size of 8.5 inches by 11 inches, around 78 grams per square meter basis weight. The data indicates that a superhydrophobic coating (i.e. CA>150 deg) is attained at a nanoclay/solids wt. ratio of 0.4. When this ratio exceeds 0.5, a dramatic reduction in CA is observed.

TABLE 3

Water Contact Angle Data for Formulation V Applied on Standard Photocopy Paper

| | Nanoclay:(PMC + Nanoclay) wt. Ratio | | | | |
|---|---|---|---|---|---|
| | 0.2 | 0.4 | 0.5 | 0.6 | 0.8 |
| Water CA data (deg) | 146.8 ± 5.1 | 152 ± 3.9 | 148 ± 5 | 110 ± 3 | 108.5 ± 8.1 |

Table 4 below lists five Kimberly-Clark® substrate materials used in spraying experiments.

TABLE 4

Kimberly-Clark ® Substrate Materials

| Sample | Substrate Name | Description |
|---|---|---|
| 1 | SMS | 25 gsm SMS (spunbond/meltblown/spunbond) |
| 2 | Spunbond | 14 gsm spunbond |
| 3 | Scott Towel | Commercial Scott ® Paper Towel |
| 4 | Kimberly-Clark ® Towel | 38 gsm Kleenex ® hard roll towel 50606 |
| 5 | Kimberly-Clark ® Viva ® Towel | 40 gsm Viva ® Paper Towel |

Confocal microscopy was used to measure porosity and to characterize the uncoated and coated samples of all substrate materials before coating. Only Formulation I was applied on all substrates for subsequent characterization by confocal microscopy.

Testing Method Descriptions:

1. Confocal Microscopy: In order to facilitate imaging by the confocal microscope (Zeiss LSM 510), all samples were coated with a fluorescent dye (Rhodamine 610). Coating was done by dissolving the dye in water, dipping the sample into the dye solution, and allowing the sample to dry under ambient conditions. By utilizing the "coffee-stain" effect, one can obtain a uniform deposition of dye onto the substrate to be imaged. Substrate porosity (or void fraction) was measured by importing confocal image stacks into Matlab and analyzing by a standard image analysis and material volume reconstruction technique. Images first underwent thresholding and were then subsequently characterized for void fraction by counting areas of void pixels (i.e., porosity) as a function of depth into the substrate.
2. Liquid Penetration Pressure: Liquid penetration measurements were made according to ASTM-F903-10.

Figure 3B:
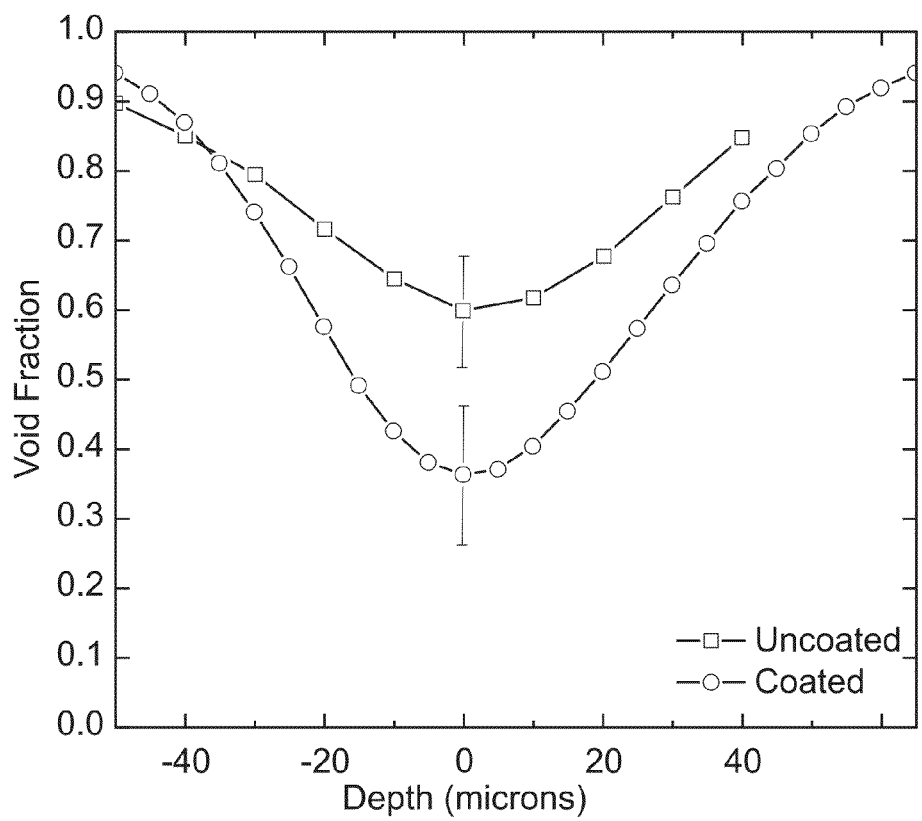
Figure 3C:
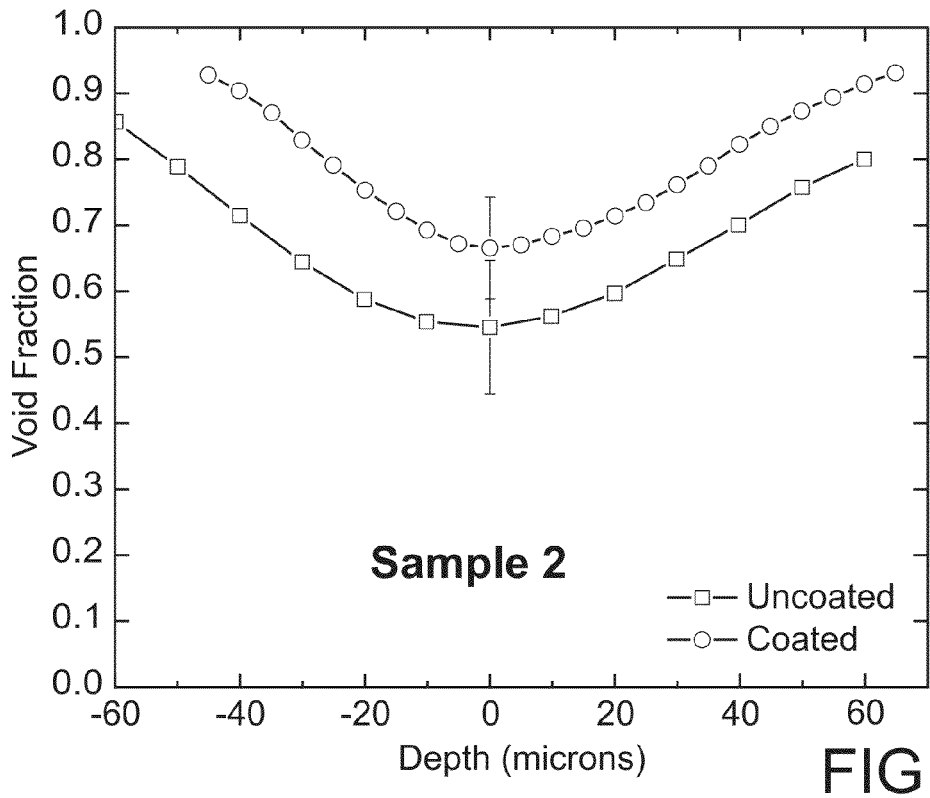
Figure 3D:
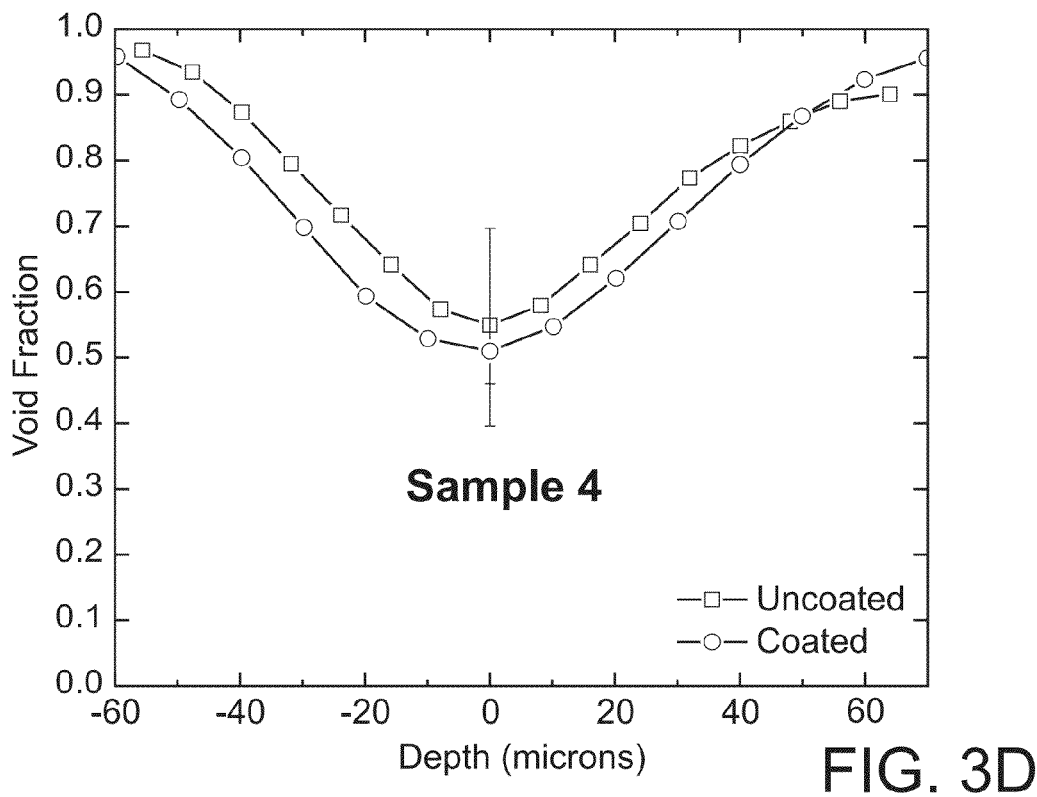

Results:

FIGS. 3b-d show substrate void fraction and z-directional depth of coated SMS, spunbond, and Kimberly-Clark® Towel before and after application of Formulation I at a rate of 27.4 g/m². (FIG. 3b show SMS substrate void fraction before and after application of Formulation I. FIG. 3c shows spunbond substrate void fraction before and after application of Formulation I. FIG. 3d shows Kimberly-Clark® Towel substrate void fraction before and after application of Formulation I).

FIG. 5 shows the hydrohead for the five samples mentioned in Table 4 after being coated with Formulation I. As shown, FIG. 5a shows the effect of coating at 13.7 g/m² while FIG. 5b shows the effect of coating at 27.4 g/m².

FIG. 6a shows the effect of coating level on both water and water-alcohol hydrohead heights of SMS (Sample 1) and FIG. 6b shows the Kimberly-Clark® Towel (Sample 4) surface coated with Formulation I. Each of these tests was performed with two probe liquids.

Figure 7:
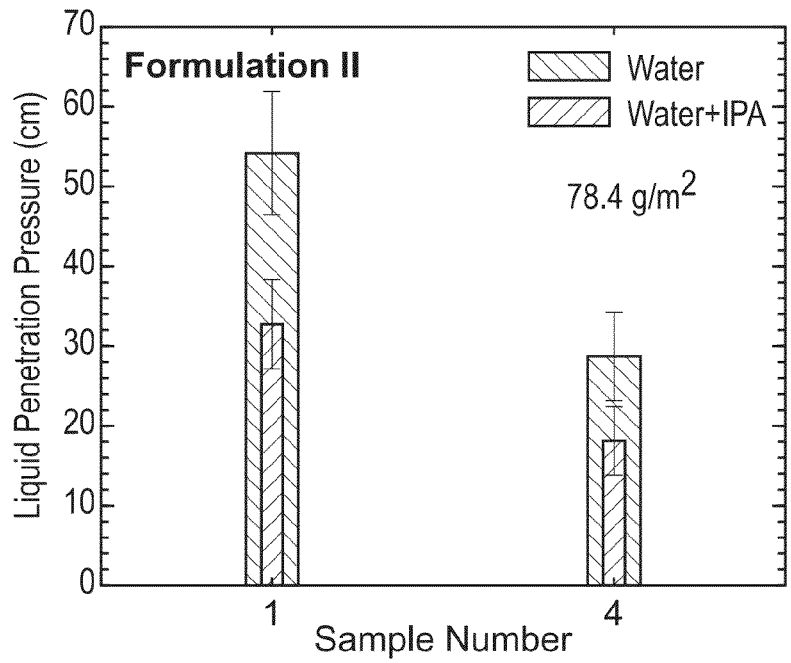
FIG. 7 shows the hydrohead for two varying samples after being coated with a formulation at a coating level of 78.4 g/m$^2$.

FIG. 7 shows the effect of Formulation II on both water and water-alcohol hydrohead height of the coated SMS (Sample 1) and Kimberly-Clark® Towel (Sample 4). The two samples were coated with Formulation II at a rate of 78.4 g/m².

Figure 8:
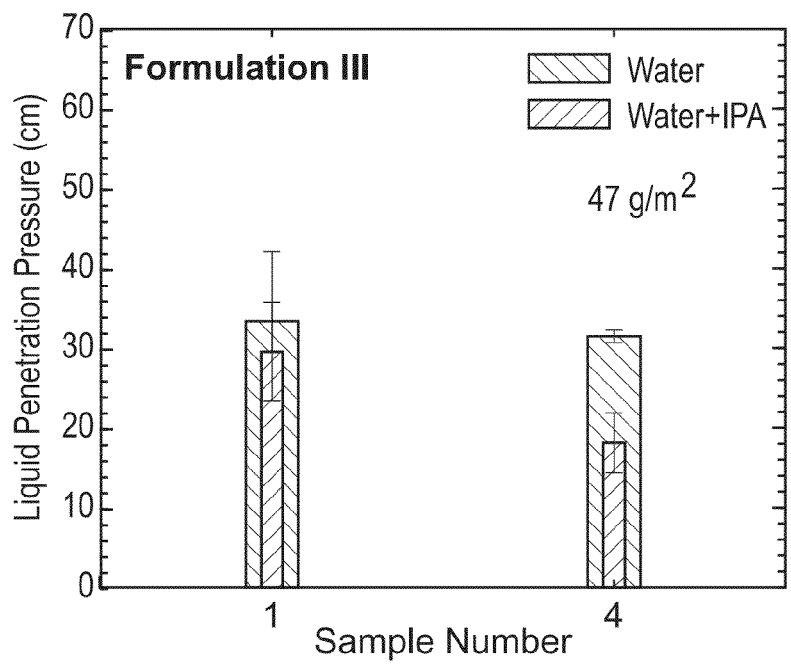
FIG. 8 shows the hydrohead for two samples coated with a formulation at a rate of 47 g/m$^2$.

FIG. 8 shows the effect of Formulation III on both water and water-alcohol hydrohead height of the coated SMS (Sample 1) and Kimberly-Clark® Towel (Sample 4). The two samples were coated with Formulation III at a rate of 47 g/m².

Figure 9:
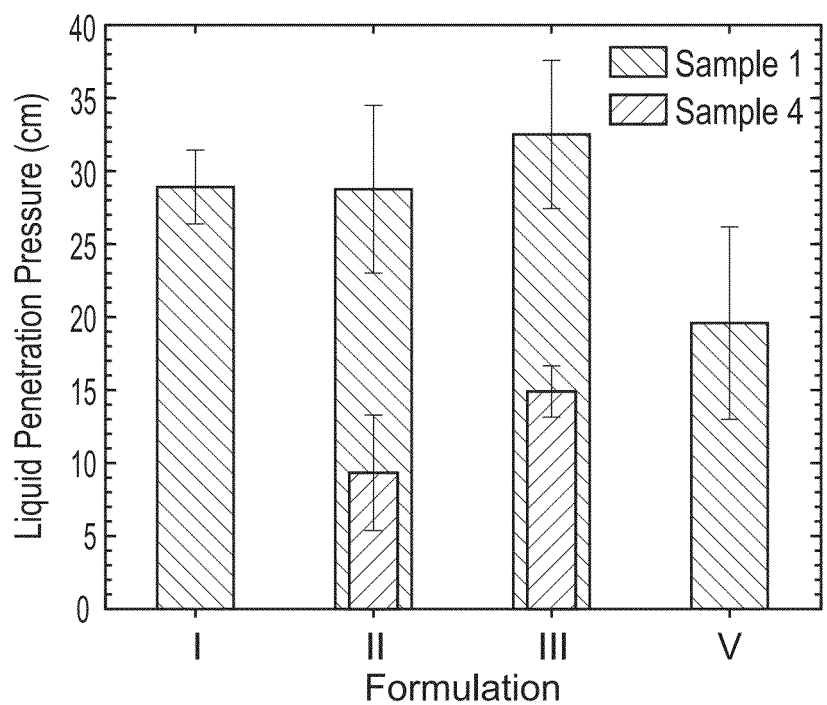
FIG. 9 shows the hydrohead for two samples coated with varying formulations. The coating levels were the minimum required for water beading, but did not guarantee measurable water penetration pressures.

FIG. 9 shows the effect of Formulations I-III and V on water hydrohead height of the coated SMS (Sample 1) and Kimberly-Clark® Towel (Sample 4). It is noted that the coating level applied in these tests was the minimum for which water beading could be achieved. For Formulations I and V on Sample 4, no hydrohead pressure was sustainable (i.e., the water penetrated the coated substrate even at zero applied pressure). In this particular case, the coating levels for Sample 1 were in the range 0.78-1.1 g/m², while for Sample 4 they were in the range 1.43-1.65 g/m² (the variability was due to substrate non-uniformities). These coatings were much thinner than those examined in FIG. 5, where higher hydroheads were measured for both of these samples (1 and 4).

Table 5 below presents water hydrohead data for Formulation V applied on standard wood-free photocopy paper (High White) substrates. The highest resistance to water penetration is provided by the coating composition with the lowest amount of nanoclay. The resistance to water penetration decreases with increased nanoclay content.

TABLE 5

Water Hydrohead Data for Formulation V Applied on Paperboard Substrates

| | Nanoclay:(PMC + Nanoclay) wt. Ratio | | | |
|---|---|---|---|---|
| | 0.2 | 0.4 | 0.6 | 0.8 |
| Hydrohead (cm H₂O) | 59.4 ± 7.6 | 37.2 ± 9.5 | 35.5 ± 19.8 | 24.6 ± 13.6 |

All documents cited herein are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A superhydrophobic dispersion composition comprising:
    a. a water dispersible hydrophobic component, wherein the hydrophobic component comprises a perfluorinated polymer modified with a comonomer;
    b. a nanoclay comprising nano-structured particles; and
    c. water, wherein a surface treated with the superhydrophobic dispersion has a water contact angle greater than 150°, wherein the superhydrophobic composition is free of an organic solvent, wherein the ratio of the weight of the nanoclay to the weight of the nanoclay and the hydrophobic component is above 0.2 and less than 0.5.

2. The superhydrophobic composition of claim 1 wherein the hydrophobic component further comprises a fluorinated polymer.

3. The superhydrophobic composition of claim 1 wherein the hydrophobic component and nano-structured particles are present in an amount of from about 1.0% to about 3.0%, by weight of the dispersion.

4. The superhydrophobic composition of claim 1 wherein the water is present in an amount of from about 95% to about 99%, by weight of the composition.

5. The superhydrophobic composition of claim 1 further comprising a surfactant in an amount of from about 0% to about 3%, by weight of the composition.

6. The superhydrophobic composition of claim 5 wherein the surfactants are selected from nonionic, cationic, or anionic surfactants.

7. The superhydrophobic composition of claim 1 wherein the comonomer is an ethylenically unsaturated carboxylic acid.

8. The superhydrophobic composition of claim 1 further comprising a stabilizing agent selected from the group consisting of long chain fatty acids, long chain fatty acid salts, ethylene-acrylic acid, ethylene-methacrylic acid copolymers, sulfonic acid, and acetic acid.

9. The superhydrophobic composition of claim 1 further comprising a filler selected from the group consisting of milled glass, calcium carbonate, aluminum trihydrate, talc, antimony trioxide, fly ash, and clays.

10. The superhydrophobic composition of claim 9 wherein the filler is present in an amount from about 0.01 to about 600 parts, by weight of the hydrophobic component.

11. The superhydrophobic composition of claim 1, wherein the nanoclay is a bentonite clay.

* * * * *